United States Patent
Mehra et al.

(10) Patent No.: US 10,809,927 B1
(45) Date of Patent: Oct. 20, 2020

(54) ONLINE CONVERSION OF STORAGE LAYOUT

(71) Applicant: Microsoft Technology Licensing, LLC, Redmond, WA (US)

(72) Inventors: Karan Mehra, Sammamish, WA (US); Vinod R. Shankar, Redmond, WA (US); Taylor Alan Hope, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/399,849

(22) Filed: Apr. 30, 2019

(51) Int. Cl.
*G06F 3/06* (2006.01)

(52) U.S. Cl.
CPC .......... *G06F 3/0635* (2013.01); *G06F 3/0604* (2013.01); *G06F 3/065* (2013.01); *G06F 3/0665* (2013.01)

(58) Field of Classification Search
CPC ...... G06F 3/0604; G06F 3/0635; G06F 3/065; G06F 3/0665
See application file for complete search history.

(56) References Cited

U.S. PATENT DOCUMENTS

| | | | |
|---|---|---|---|
| 7,290,168 B1 | 10/2007 | Dekoning | |
| 2004/0123062 A1 | 6/2004 | Dalal et al. | |
| 2005/0086429 A1* | 4/2005 | Chatterjee | G06F 11/1096 711/114 |
| 2005/0198447 A1* | 9/2005 | Corrado | G06F 16/9027 711/152 |
| 2006/0112300 A1* | 5/2006 | Noya | G06F 11/1435 714/6.21 |
| 2009/0037656 A1* | 2/2009 | Suetsugu | G06F 11/1092 711/114 |
| 2009/0172277 A1* | 7/2009 | Chen | G06F 3/0617 711/114 |
| 2010/0191907 A1* | 7/2010 | Ish | G06F 11/1096 711/114 |
| 2014/0223096 A1* | 8/2014 | Zhe Yang | G06F 12/0871 711/114 |
| 2015/0019807 A1 | 1/2015 | Malkin et al. | |

FOREIGN PATENT DOCUMENTS

EP 2372520 A1 10/2011

OTHER PUBLICATIONS

"International Search Report and Written Opinion Issued in PCT Application No. PCT/US2020/026053", dated Jul. 22, 2020, 12 pages.

* cited by examiner

*Primary Examiner* — Larry T Mackall
(74) *Attorney, Agent, or Firm* — Newport IP, LLC; Han Gim

(57) ABSTRACT

A virtual disk is instantiated as a representation of a storage volume. The virtual disk is configured with metadata corresponding to the storage volume. A storage stack is instantiated that is operable to provide an active I/O path to the storage volume. The storage stack is modified by adding an alternative I/O path to the virtual disk. The alternative I/O path includes a layout driver configured to manage a converted storage layout for the storage volume. The storage volume is encapsulated to the virtual disk. The active I/O path is closed and the alternative I/O path is enabled for I/O requests to the virtual disk. The storage layout of the storage device is converted without taking the storage volume offline.

20 Claims, 11 Drawing Sheets

ONLINE CONVERSION OF STORAGE LAYOUT

BACKGROUND

Data storage devices are susceptible to physical failures, and fault tolerant techniques can be employed to avoid or minimize the impact of such failures. In some examples, physical disk drives may be combined into one or more logical units to provide data redundancy and performance improvement. Data may also be distributed across the drives depending on the desired level of redundancy, performance, reliability, availability, and capacity. Different levels of resiliency can be achieved, for example, by different mirroring schemes or parity schemes. Mirroring is the replication of data that comprise logical disk volumes to provide redundancy. A mirrored volume may be a logical representation of separate volume copies. Alternatively, various parity schemes, can be used to achieve resiliency. In some examples, a parity drive may be implemented to provide resilience/redundancy.

Data storage devices may also implement performance schemes to improve I/O speeds. In some examples, data may be stored across multiple storage devices using striping, where data is logically segmented onto different physical storage devices. Striping also allows for load balancing of I/O tasks across multiple storage devices.

It is with respect to these and other considerations that the disclosure made herein is presented. The subject matter claimed herein is not limited to embodiments that solve any disadvantages or that operate only in environments such as those described above. Rather, this background is only provided to illustrate one exemplary technology area where some embodiments described herein may be practiced.

SUMMARY

The techniques disclosed herein provide for improvements in the implementation of data resiliency schemes such as mirroring and parity. The improvements can include minimizing or avoiding downtime when adding, changing, or removing a data resiliency scheme.

A computing device or more generally a computing resource may have an initial storage layout that may or may not implement a resiliency scheme or a performance scheme. In many cases, it may be desired to add a resiliency scheme when there is no resiliency that was initially implemented. In other cases, it may be desired to change the resiliency scheme that was initially implemented. In some cases, it may be desired to add a performance scheme when there is no performance scheme that was initially implemented.

When adding, changing, or removing a resiliency or performance scheme, significant changes are typically needed to implement the change. Furthermore, a function with the capacity to manage multiple disks may now be needed. Many systems require that the storage device or devices be taken offline to implement the changes to the performance or resiliency scheme. However, it is preferable if the changes can be implemented online so that the user can continue to access and use the storage resources. Even when the conversion is implemented online, it would further be desirable to avoid having to perform a system reboot in order to allow the changes to be effected.

The present disclosure describes techniques for implementing a change to a storage layout without taking the storage device offline. The change can be made seamlessly in the background, allowing the user to continue to use the storage resources. Online storage layout changes allow for reduction or elimination of downtime in order to implement changes to a storage layout. This can result in more efficient use of computing resources such as processor cycles, memory, network bandwidth, and power, as compared to previous solutions relying upon inefficient offline processes that require dedicated resources and higher cost, while minimizing or eliminating user downtime and providing for a more productive user experience.

In one embodiment, a storage conversion application may be implemented to manage the conversion of storage of data from one storage disk or volume to multiple disks or volumes, and from multiple disks or volumes to one storage disk or volume. In an embodiment, a virtual disk may be allocated. The virtual disk may have multiple underlying disks depending on the particular resiliency or performance scheme. There are now multiple paths to the same disk, with the new path identified as a pending path. I/O can now flow through the original (active) path, and also through the new (pending) path. The active path may then be removed, and new I/O requests may only be sent to the new (pending) path. Once the new path is established, the physical disk may be mirrored (or other layouts may be implemented).

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques disclosed herein provide for improvements in the implementation of data resiliency schemes such as mirroring and parity. The improvements can include minimizing or avoiding downtime when adding, changing, or removing a data resiliency scheme.

As used herein, "storage stack" refers to an entity that may include a layering of various drivers, filters, encryption logic, antivirus logic, etc. that may be used to handle transfers/transformation of data/information from main memory to other storage. For example, for I/O requests (e.g., "read/write" requests), a block of data may be "packaged" (e.g., using a construct such as an IRP (I/O Request Packet)) and passed down the stack; thus, entities in the stack handle the transfer of that data from main memory to storage. Generally, such "I/O" operations (e.g., "read/write" operations) involve more processing time (and hence, more delay time) than traditional "load/store" operations that may occur directly between a CPU and main memory (e.g., with no "storage stack" involvement in such operations).

The term "file system" is used by way of example and the discussion of example techniques herein may also be applied to other types of file systems. In this context, a "file system" may include one or more hardware and/or software components that organize data that is persisted. For example, persisted data may be organized in units that may be referred to as "files"—and thus, a "file system" may be used to organize and otherwise manage and/or control such persisted data. For example, a "file" may be associated with a corresponding file name, file length, and file attributes. A file handle may include an indicator (e.g., a number) used by the file system to uniquely reference a particular active file.

Figure 1:
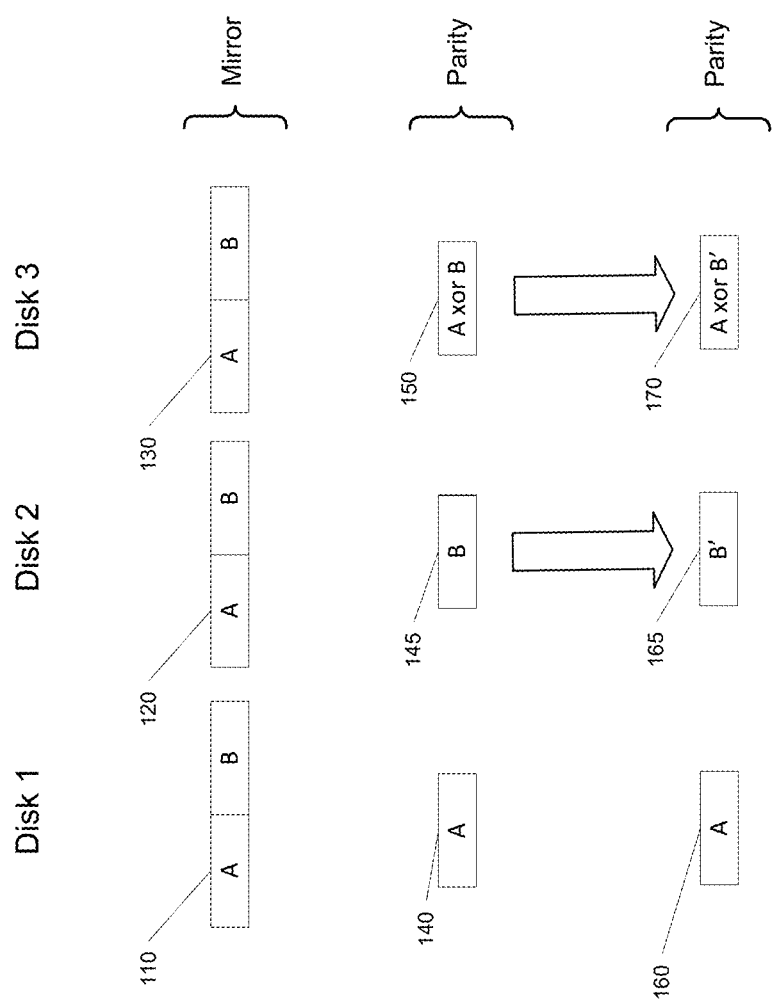
FIG. 1 is a diagram illustrating example resiliency schemes.

A computing device or more generally a computing resource may have an initial storage layout that may or may not implement a resiliency scheme or a performance scheme. Referring to FIG. 1, illustrated are examples of a mirroring scheme and a parity scheme which may be implemented to provide resiliency. Two data blocks A and B are shown initially as data group 110 that may be stored on disk 1. For mirroring with two backups, data blocks A and B are shown replicated as data groups 120 and 130 on disk 2 and disk 3, respectively. In a parity scheme, data blocks A 140 and B 145 are shown on disks 1 and 2, and backed by XOR'ing the data and saved as parity 150. When data B is updated to data B', then the parity is updated by XOR'ing the updated data B and stored as updated parity data 170. As can be seen, depending on when a power interruption occurs during the process, there exists a potential for loss of synchronization between the intended writes and the actual written data. It should be noted that the described examples may be implemented in a variety of applicable parity schemes and are not limited to the specific examples described herein. For example, both RAID5 and RAID6 are example scenarios where the described embodiments may be implemented.

In many cases, it may be desired to add a resiliency scheme when there is no resiliency that was initially implemented. For example, a user may not have had the need for a resiliency scheme when initially configuring the computing resource, but later decides to add a mirrored copy of a storage volume for resiliency. It may also be desired to remove a resiliency scheme when there is a resiliency scheme that was initially implemented. For example, a user may have had a need for a resiliency scheme when initially configuring the computing resource and configured a mirrored copy of a storage volume for resiliency, but later decides to remove the mirrored copy.

In other cases, it may be desired to change the resiliency scheme that was initially implemented. For example, a user may have had a need for a mirroring scheme when initially configuring the computing resource and configured a three-way mirror of a storage volume for resiliency, but later decides to reduce the amount of storage resources used for resiliency and change the resiliency scheme to parity. In some cases, it may be desired to add a performance scheme when there is no performance scheme that was initially implemented. For example, a user may have not had the need for a performance scheme when initially configuring the computing resource, but later decides to add striping to improve I/O performance.

When adding, changing, or removing a resiliency or performance scheme, significant changes are typically needed to implement the change. When data is stored on a storage device, a mechanism is needed to provide visibility and discoverability of the location of the stored data that is captured in metadata, such as in a file system. Additionally, data can be stored into different silos of data that may have different file systems, partitions, volumes, and the like. The mapping of data must be maintained and namespaces must be managed so that the data is accessible and modifiable. When an OEM initially ships a computing device, the OEM typically implements the simplest storage layout that does not include a resiliency or performance scheme, with everything stored on one physical volume or disk. At some point, the user may want to bring in a resiliency or performance scheme as described above, or to extend storage capacity. When doing so, the layout may change from one disk to multiple disks, and significant changes to the underlying storage layout are needed. Furthermore, a function with the capacity to manage multiple disks is now needed.

Many systems require that the storage device or devices be taken offline to implement the changes to the performance or resiliency scheme. In this case, the storage devices are taken down or are otherwise not accessible to the user while the changes are being implemented, typically in a different mode or environment. However, it would be preferable if the changes can be implemented online so that the user can continue to access and use the storage resources. Even when the conversion is implemented online, it would further be desirable to avoid having to perform a system reboot in order to allow the changes to be effected.

The present disclosure describes techniques for implementing a change to a storage layout without taking the storage offline. The change can be made seamlessly in the background, allowing the user to continue to use the storage resources. Online storage layout changes allow for reduction or elimination of downtime in order to implement changes to a storage layout. This can result in more efficient use of computing resources such as processor cycles, memory, network bandwidth, and power, as compared to previous solutions relying upon inefficient offline processes that require dedicated resources and higher cost, while minimizing or eliminating user downtime and providing for a more productive user experience. Technical benefits other than those specifically described herein might also be realized through implementations of the disclosed technologies.

Online conversion of a storage layout presents a number of technical challenges in order to enable the conversion from the use of a single storage volume or disk to multiple storage volumes or disks (and vice versa) while continuing the execution of I/O operations.

In one embodiment, a storage conversion application may be implemented to manage the conversion of storage of data from one storage disk or volume to multiple disks or volumes, and from multiple disks or volumes to one storage disk or volume. The storage conversion application may implement part or all of a process to convert the storage layout of a storage device or system.

When a single storage volume or disk is implemented, a storage stack may be implemented to support the use of the single disk. To enable support for use of a different storage layout, one solution is to implement and continuously make available the capability to support multiple storage layouts in the event that a storage conversion is to be performed. However, this would be an inefficient use of resources, and the stack may be constructed to be as performant as possible, thus supporting only the use of the single disk. For performance reasons, it would be preferable to add the additional capability only when needed, and convert the storage stack to support the desired capabilities at the time that they are needed. Additionally, the conversion may be implemented while I/O operations continue to run, to provide the advantages described above.

The techniques disclosed herein may provide the conversion of a storage layout for any type of storage mechanism including parity, mirroring, striping, and so on.

Figure 2:
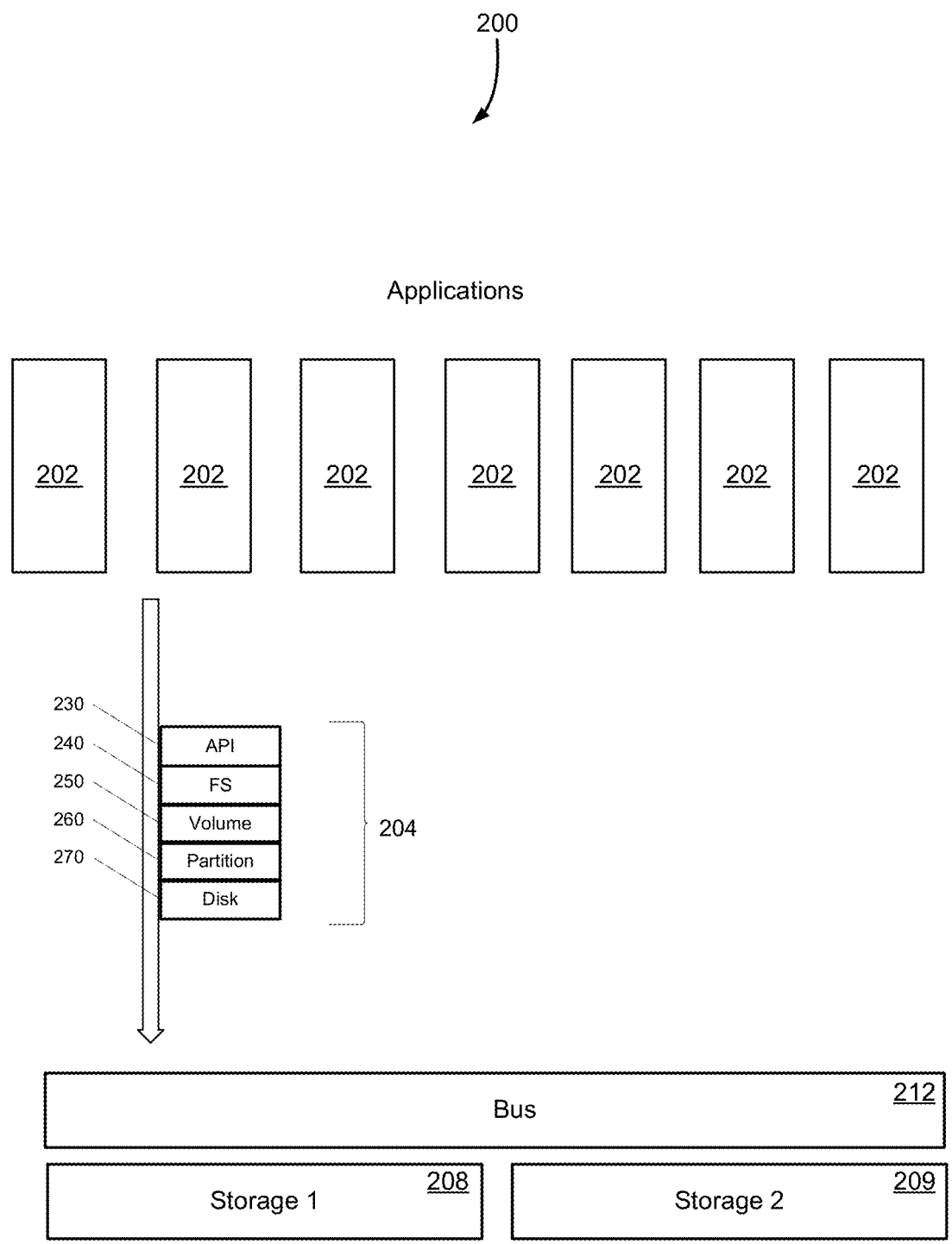
FIG. 2 is a diagram illustrating an example of a storage system including a stack, according to the described implementations.

Referring to FIG. 2, illustrated is an example computing environment including aspects of the present disclosure. Referring to FIG. 2, illustrated is a computing environment 200 that may be viewed as a collection of shared storage resources according to one embodiment. The computing environment may include a number of applications 202 that are running in the computing environment 200. For example, the computing environment 200 may be a virtualized computing environment and may include virtual machine containers. The virtual machine containers may be hosted on physical hosts that may vary in hardware and/or software configurations. Each container may be capable of hosting a virtual machine. Computing environment 200 may also include one or more routers (not shown on FIG. 2) which may service multiple physical hosts to route network traffic. A controller or provisioning server (not shown in FIG. 2) may include a memory and processor configured with instructions to manage workflows for provisioning and de-provisioning computing resources as well as detecting accessing storage resources. As shown in FIG. 2, an application 202 may access a bus 212 to read or write data to storage type 1 208 or storage type 2 209. In order to do so, services provided by stack 204 comprising a number of layers 204 may be provided. The application of the described techniques may be illustrated in the context of virtualized services but not limited to virtualized services. Any application that accesses or otherwise utilizes storage devices and services may implement the described techniques.

The example stack 204 illustrated in FIG. 2 includes a disk driver 270, partition manager 260, volume manager 250, file system 240, API layer 230, and applications 202. In one example, the stack 204 may initially be configured to manage I/O for a storage layout that does not include mirroring or other schemes. If mirroring is to be added, then additional functionality may need to be added to the illustrated flow to implement mirroring. In an embodiment according to the present disclosure, the functionality may be inserted into the flow without requiring the system to be taken offline and without requiring a reboot.

Figure 3A:
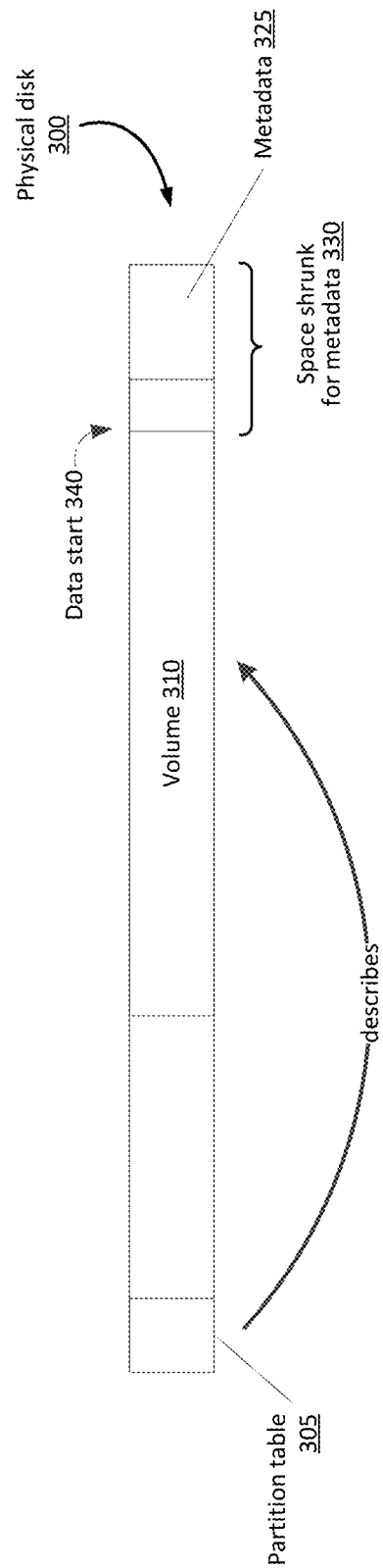
FIG. 3A is a diagram illustrating an example of a storage volume, according to the described implementations.

Referring to FIG. 3A, a disk 300 may have an associated partition table 305, which may be in a Master Booth Record (MBR) or GUID Partition Table (GPT) format that describes how the logical partitions are organized on the disk. The disk 300 may have a volume 300 that is managed by a file system. In the example shown in FIG. 3, the disk does not implement a resiliency scheme, and it is desired to add mirroring without taking the disk offline.

Referring to FIG. 3A, in an embodiment, a virtual disk 320 may be allocated for the mirrored storage layout. Metadata 325 for the virtual disk 320 may first be established and space 330 may be allocated for this purpose. Furthermore, the mirroring metadata may be duplicated for the original disk so that both disks now have this mirroring metadata.

Generally, the virtual disk 320 may be cloned from the physical disk 300. The virtual disk 320 may then be the virtual device that the upper layers of the stack communicate with in the new storage layout. The virtual disk 320 may have multiple underlying disks depending on the particular resiliency or performance scheme. In an embodiment, the following operations may be performed to prepare the virtual disk 320 to insert the components needed to implement the new layout:

1. shrink the volume (C:) to reserve space 330 for metadata storage (if multiple partitions, then only the last partition needs to be shrunk)

2. create a pool (i.e., a collection of disks of the mirroring set) and create metadata in the reserved space and pool 3. allocate space (e.g., create the virtual disk)—the metadata 325 may be updated to indicate the properties of the virtual disk 320

4. clone identity of the physical disk 300 to the virtual disk 320 by determining the disk identity and other information and adding to the metadata for the virtual disk.

5. encapsulate the partition(s)—in this example, the space allocated for the metadata 330 was more than was needed, and the remaining portion of the space 330 which begins at 340 is encapsulated as the start of the data. The data then wraps to the beginning of the volume C.

Once the physical disk 300 is cloned to the virtual disk 320, the virtual disk 320 may be considered as the representation of the physical disk 300. The partition table 305 may now indicate the presence of volume C. The metadata 325 may be considered another partition, and the remaining area in space 300 may be considered a third partition.

Figure 3B:
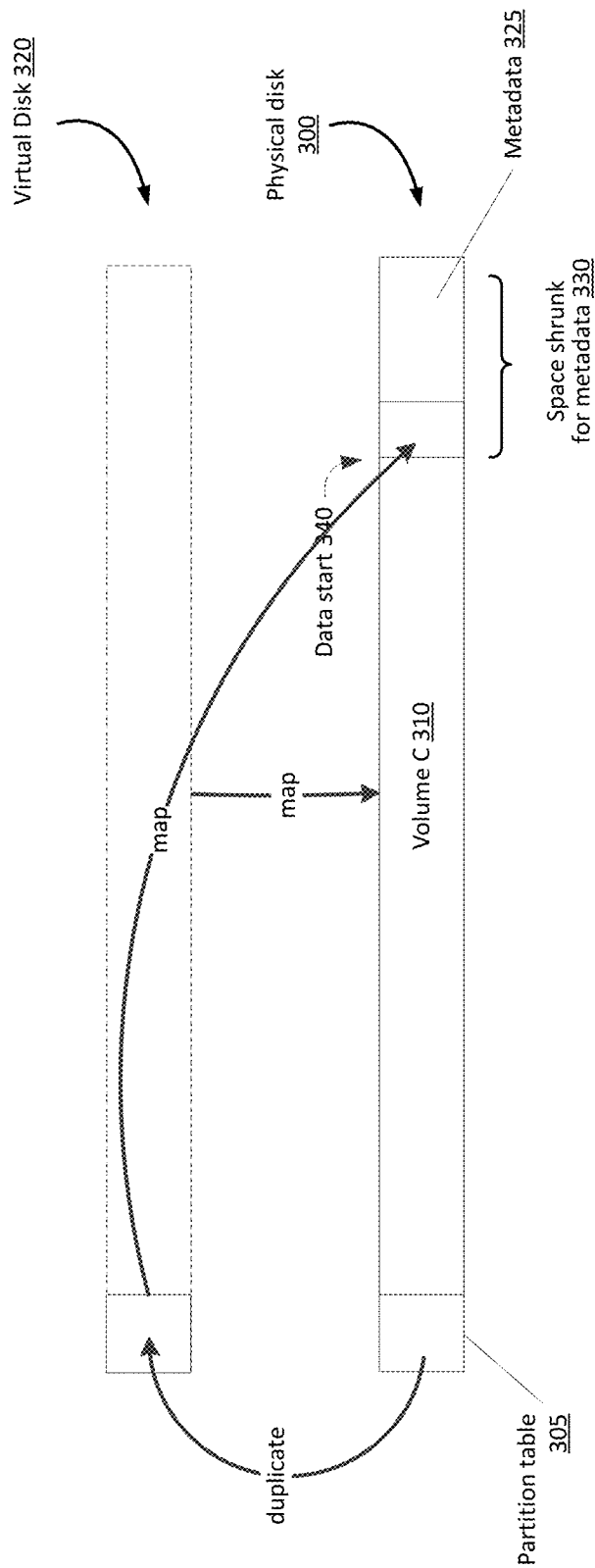
FIG. 3B is a diagram illustrating an example of a storage volume, according to the described implementations.
Figure 4:
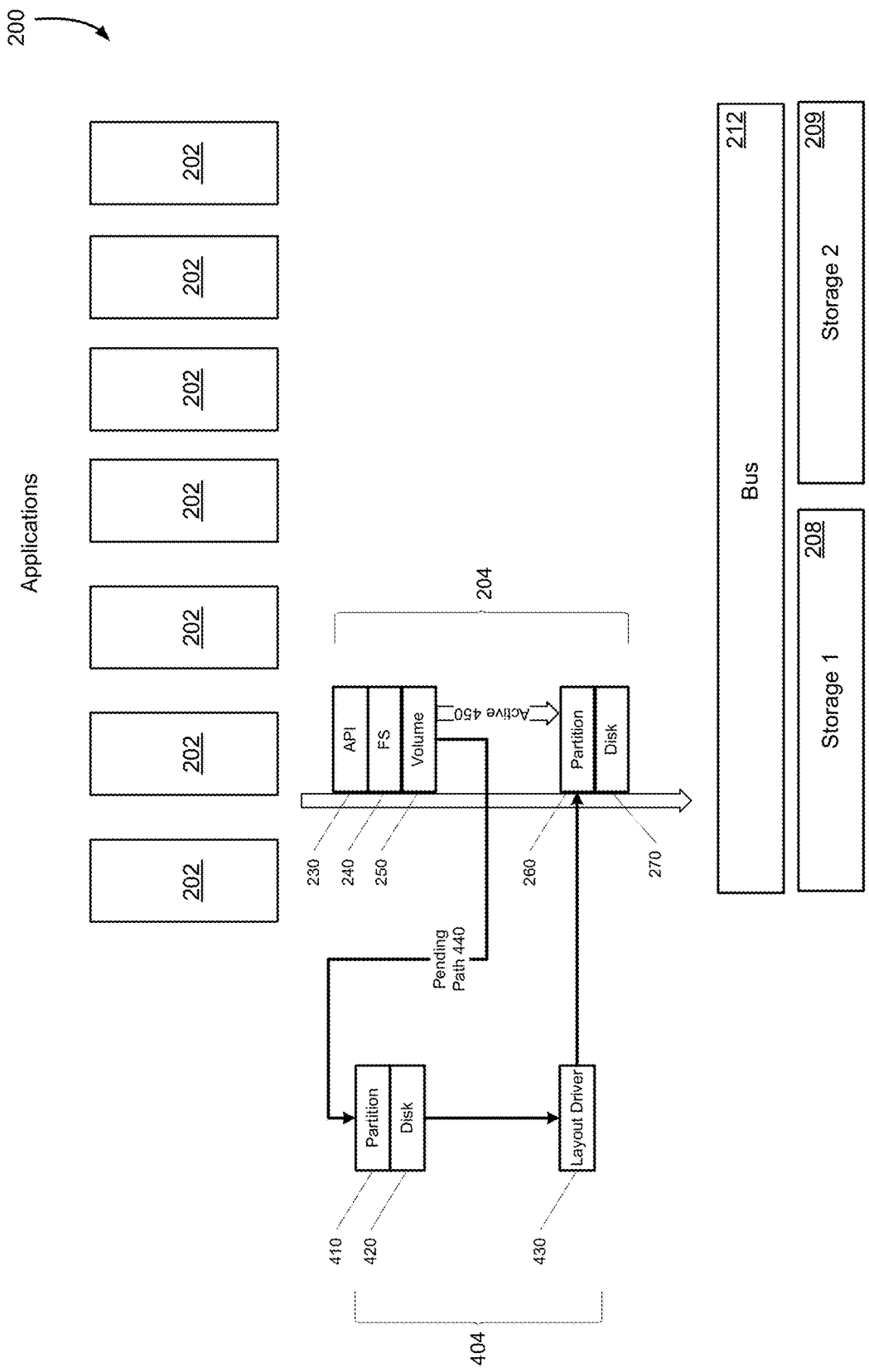
FIG. 4 is a diagram illustrating an example of a storage system including a stack, according to the described implementations.

FIG. 4 illustrates an example computing environment including aspects of the present disclosure, and as initially illustrated in FIG. 2. Referring to FIG. 4, illustrated are new stack components 404 that may be instantiated and includes a partition manager 410, disk manager 420, and a layout driver 430. The partition manager 410 may receive a notification of the new partitions illustrated in FIG. 3. The partition manager 410 may further receive a notification that the new partitions belong to the new stack 404. The new stack 404 may determine that it is responsible for the virtual disk 320. The partition manager 410 may be assigned to the virtual disk 320. At this point, the partition manager 410 is exposed to two disks with the same identifiers—the virtual disk 320 and the physical disk 300. As it appears that there are multiple paths to the same disk, the partition manager 410 notifies the volume manager 250 that two paths exist. The current volume manager 250 identifies that new path as the pending path 440. I/O can now flow through the original (active) path 450, and also through the new (pending) path 440. Either path will result in updates to the same physical location, as the physical disk 300 underlies the virtual disk 320.

Figure 5:
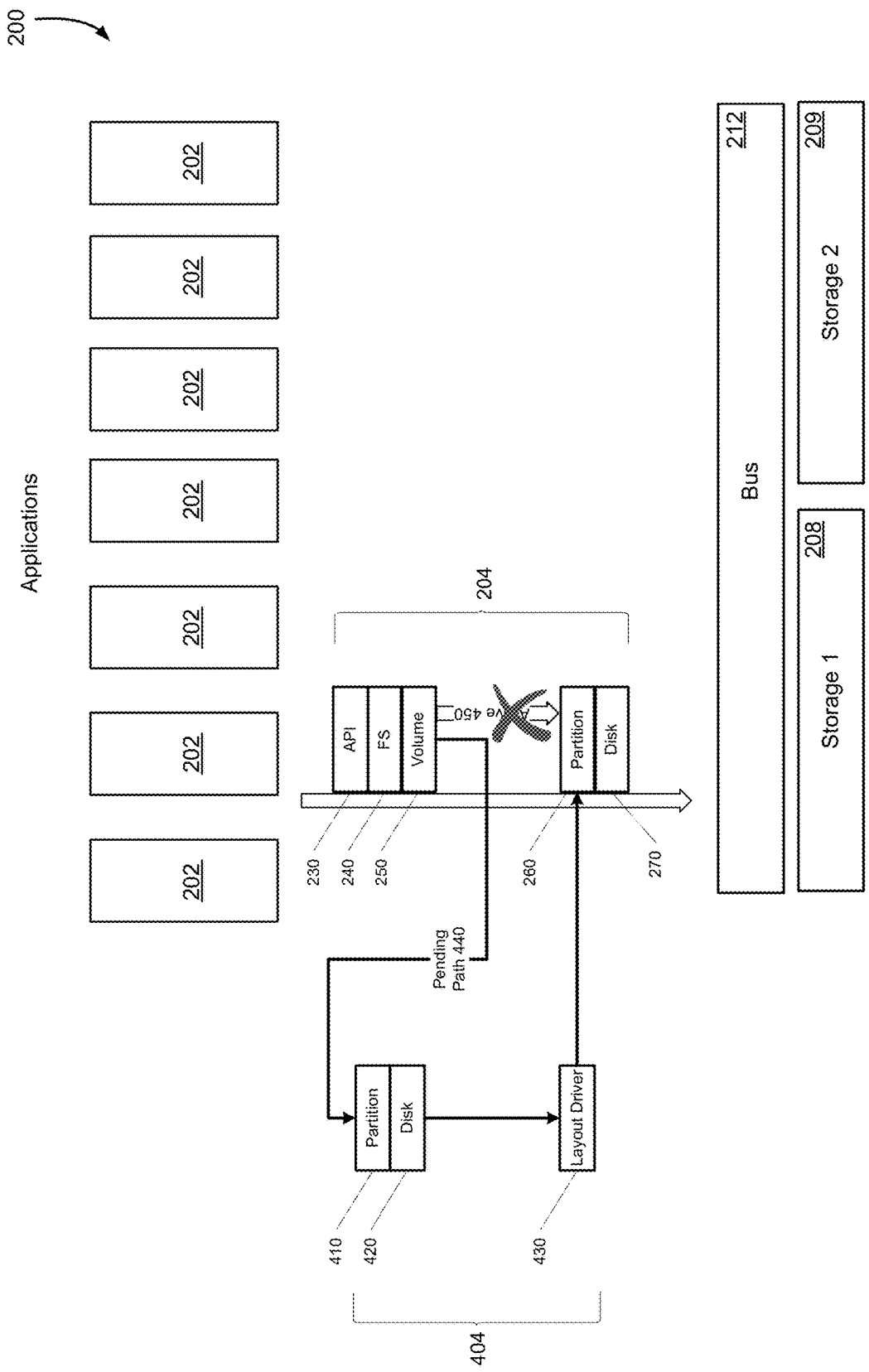
FIG. 5 is a diagram illustrating an example of a storage system including a stack, according to the described implementations.

When the preparation tasks have been completed, the partition table 305 of the physical disk 300 may be updated to remove C:, which results in the active path 450 being removed. This is illustrated in FIG. 5. Existing I/O requests for active path 450 may be completed, and new I/O requests may only be sent to the new (pending) path 440. At this point, the new stack 404 is the primary I/O path. In an embodiment, both active and pending paths may be recognized by the volume manager 250.

More generally, the following process may be implemented:

A. determine that two partitions (volumes) are the same (e.g., multiple paths to the same disk)

B. maintain active and pending paths for a volume; and

C. switch from the active to pending path when the active path is removed.

Once the new path is established, the physical disk 300 may be mirrored.

Figure 6:
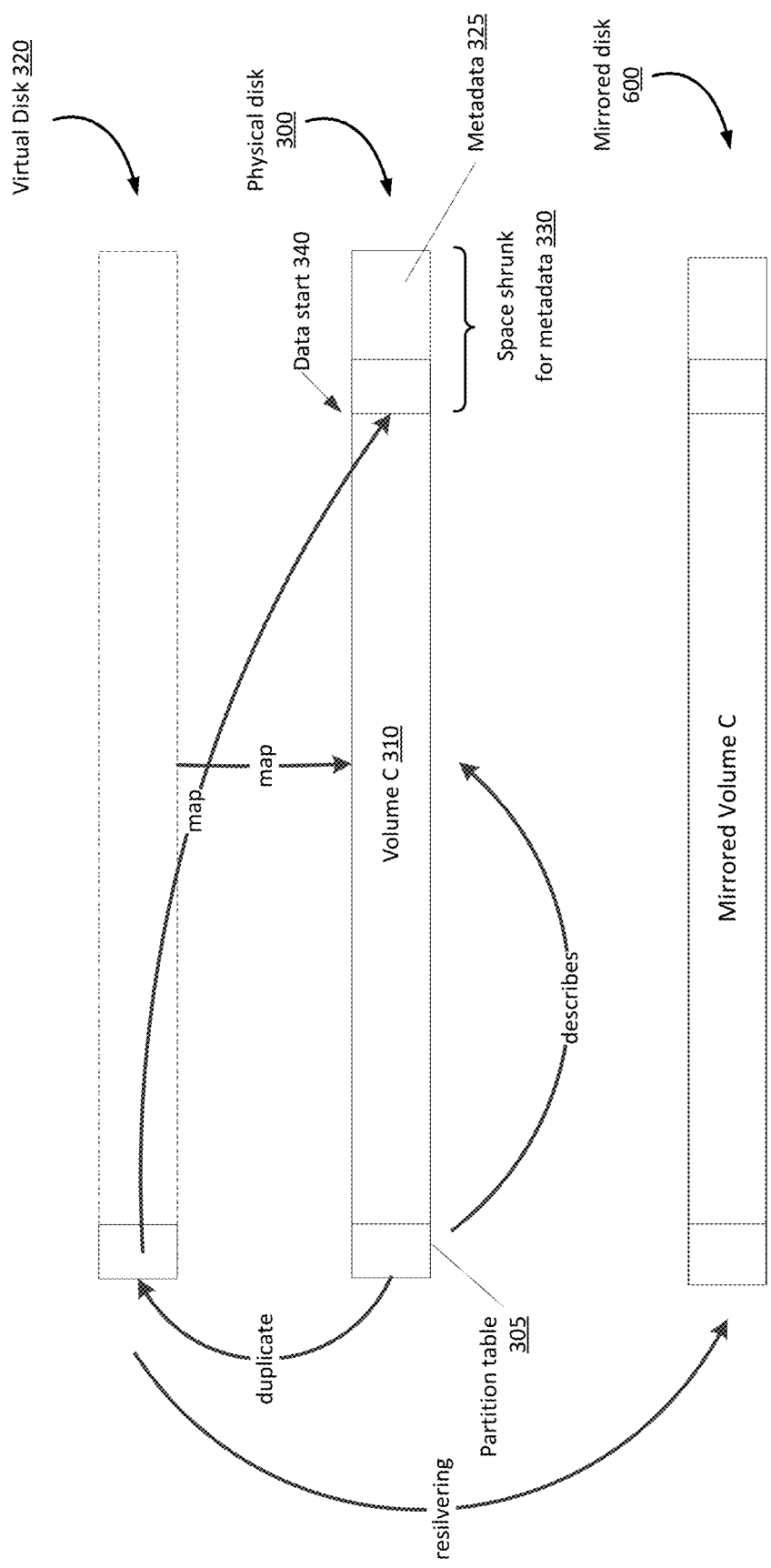
FIG. 6 is a diagram illustrating an example of a storage volume, according to the described implementations.

Continuing from above to implement a mirrored copy to the example shown in FIGS. 3A and 3B, and as illustrated in FIG. 6:

6. A new drive is added to the storage pool

7. Perform resilvering (regenerating) to create a copy of the data from the physical disk 300 (via the virtual disk 320) to mirrored copy 600.

Upon completion of the resilvering process, data will be mirrored on both the physical disk 300 and mirrored copy 600, which underly the virtual disk 320.

To change a storage layout from having mirroring or other resiliency scheme to a single physical disk, then the reverse of the described process may be implemented.

Figure 7:
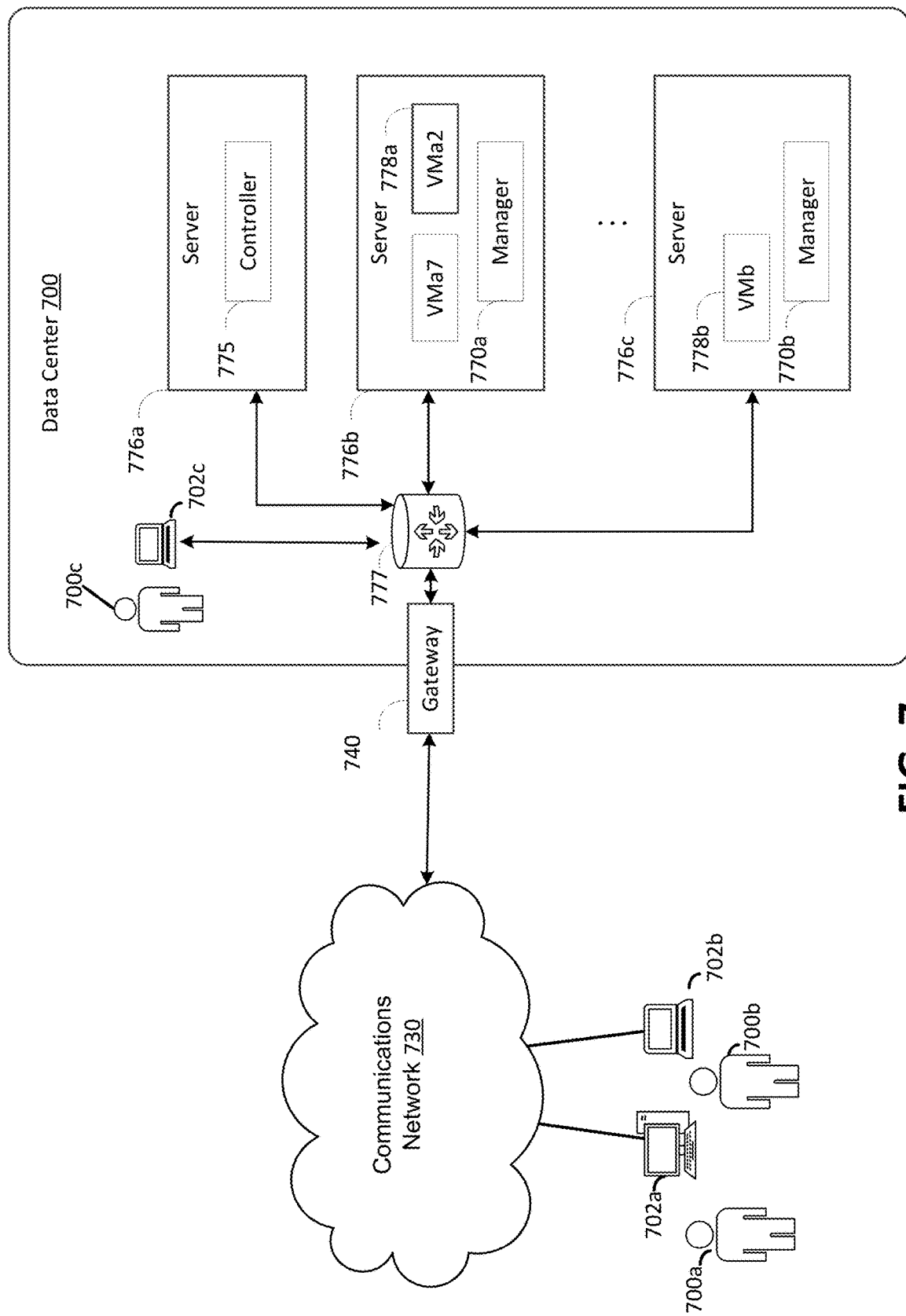
FIG. 7 is a diagram illustrating an example of computing environment, according to the described implementations.

FIG. 7 illustrates an example computing environment in which the embodiments described herein may be implemented. FIG. 7 illustrates a data center 700 that configured to provide computing resources to users 700a, 700b, or 700c (which may be referred herein singularly as "a user 700" or in the plural as "the users 700") via user computers 702a, 702b, and 702c (which may be referred herein singularly as "a computer 702" or in the plural as "the computers 702") via a communications network 730. The computing resources provided by the data center 700 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 700 may include servers 776a, 776b, and 776c (which may be referred to herein singularly as "a server 776" or in the plural as "the servers 776") that provide computing resources available as virtual machines 778a and 778b (which may be referred to herein singularly as "a virtual machine 778" or in the plural as "the virtual machines 778"). The virtual machines 778 may be configured to execute applications such as Web servers, application servers, media servers, database servers, and the like. Other resources that may be provided include data storage resources (not shown on FIG. 7) and may include file storage devices, block storage devices, and the like. Servers 776 may also execute functions that manage and control allocation of resources in the data center, such as a controller 775. Controller 775 may be a fabric controller or another type of program configured to manage the allocation of virtual machines on servers 776.

Referring to FIG. 7, communications network 730 may, for example, be a publicly accessible network of linked networks and may be operated by various entities, such as the Internet. In other embodiments, communications network 730 may be a private network, such as a corporate network that is wholly or partially inaccessible to the public.

Communications network 730 may provide access to computers 702. Computers 702 may be computers utilized by users 700. Computer 702a, 702b or 702c may be a server, a desktop or laptop personal computer, a tablet computer, a smartphone, a set-top box, or any other computing device capable of accessing data center 700. User computer 702a or 702b may connect directly to the Internet (e.g., via a cable modem). User computer 702c may be internal to the data center 700 and may connect directly to the resources in the data center 700 via internal networks. Although only three user computers 702a, 702b, and 702c are depicted, it should be appreciated that there may be multiple user computers.

Computers 702 may also be utilized to configure aspects of the computing resources provided by data center 700. For example, data center 700 may provide a Web interface through which aspects of its operation may be configured through the use of a Web browser application program executing on user computer 702. Alternatively, a stand-alone application program executing on user computer 702 may be used to access an application programming interface (API) exposed by data center 700 for performing the configuration operations.

Servers 776 may be configured to provide the computing resources described above. One or more of the servers 776 may be configured to execute a manager 720a or 720b (which may be referred herein singularly as "a manager 720" or in the plural as "the managers 720") configured to execute the virtual machines. The managers 720 may be a virtual machine monitor (VMM), fabric controller, or another type of program configured to enable the execution of virtual machines 778 on servers 776, for example.

It should be appreciated that although the embodiments disclosed above are discussed in the context of virtual machines, other types of implementations can be utilized with the concepts and technologies disclosed herein. For example, the embodiments disclosed herein might also be utilized with computing systems that do not utilize virtual machines.

In the example data center 700 shown in FIG. 7, a router 777 may be utilized to interconnect the servers 776*a* and 776*b*. Router 777 may also be connected to gateway 740, which is connected to communications network 730. Router 777 may manage communications within networks in data center 700, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 700 described in FIG. 7 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 8:
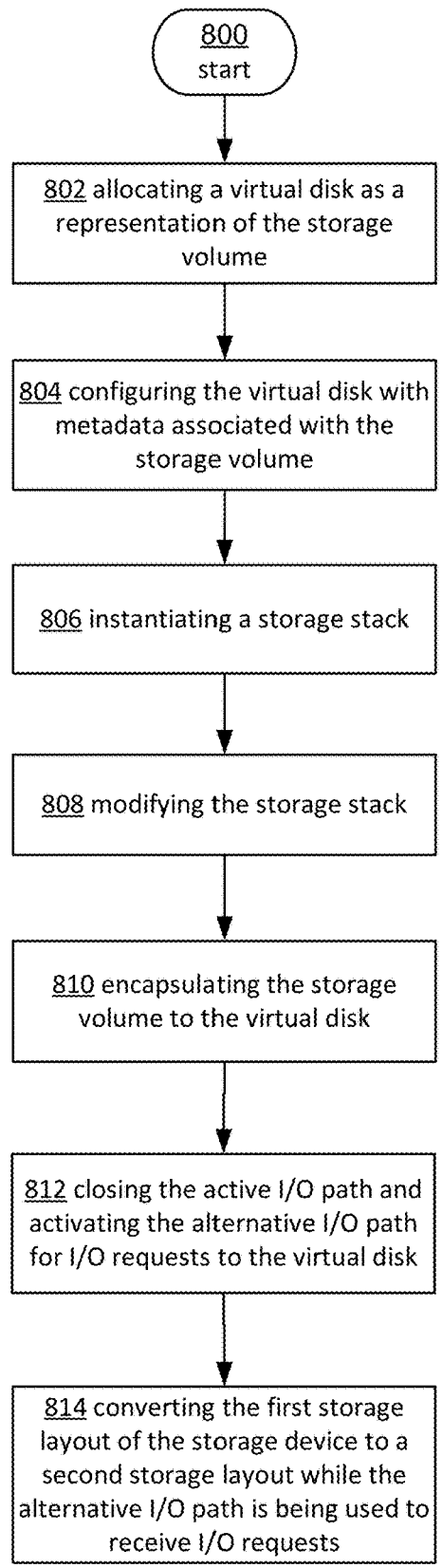
FIG. 8 is a diagram illustrating an example operational procedure, according to the described implementations.

Referring to FIG. 8, illustrated is an example operational procedure in accordance with the present disclosure. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine are described herein as being implemented, at least in part, by modules running the features disclosed herein and can be a dynamically linked library (DLL), a statically linked library, functionality produced by an application programming interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine may be also implemented in many other ways. For example, the routine may be implemented, at least in part, by a processor of another remote computer or a local circuit. In addition, one or more of the operations of the routine may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Referring to FIG. 8, Operation 800 begins the procedure. Operation 800 may be followed by Operation 802. Operation 802 illustrates allocating a virtual disk as a representation of the storage volume. In an embodiment, the storage volume has a first storage layout. Operation 802 may be followed by Operation 804. Operation 804 illustrates configuring the virtual disk with metadata associated with the storage volume. Operation 804 may be followed by Operation 806. Operation 806 illustrates instantiating a storage stack that is operable to provide an active I/O path to the storage volume. Operation 806 may be followed by Operation 808. Operation 808 illustrates modifying the storage stack by adding an alternative I/O path to the virtual disk. In an embodiment, the alternative I/O path includes a layout driver configured to manage a converted storage layout for the storage volume.

Operation 808 may be followed by operation 810. Operation 810 illustrates encapsulating the storage volume to the virtual disk. Operation 810 may be followed by operation 812. Operation 812 illustrates closing the active I/O path and activating the alternative I/O path for I/O requests to the virtual disk. Operation 812 may be followed by operation 814. Operation 814 illustrates converting the first storage layout of the storage device to a second storage layout while the alternative I/O path is being used to receive I/O requests.

Figure 9:
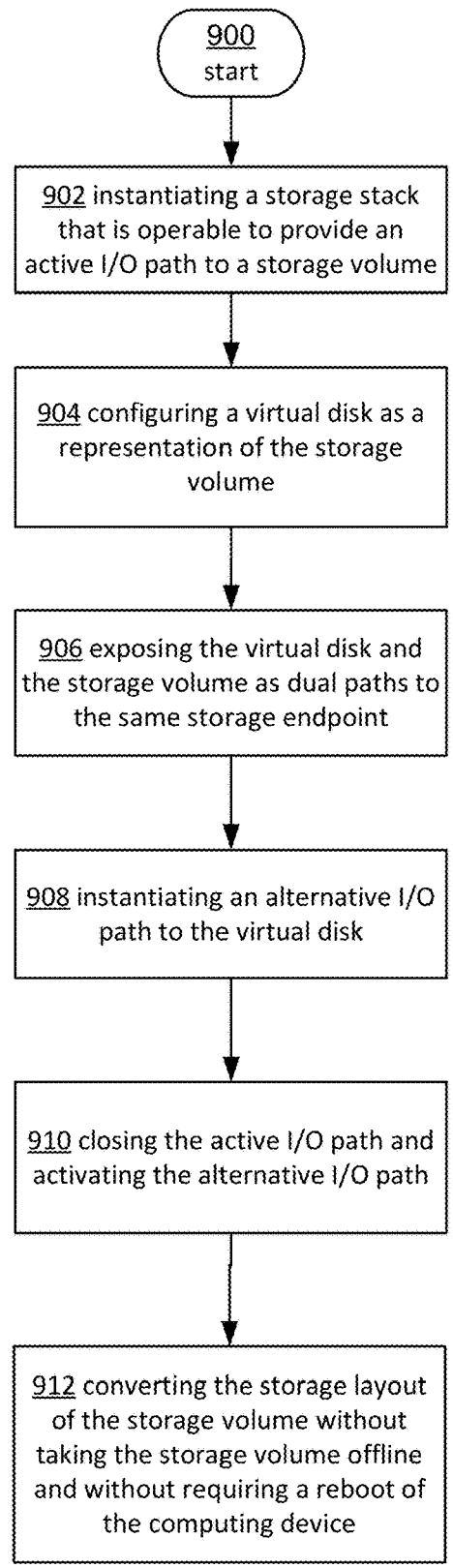
FIG. 9 is a diagram illustrating an example operational procedure, according to the described implementations.

Referring to FIG. 9, illustrated is an example operational procedure in accordance with the present disclosure. Referring to FIG. 9, Operation 900 begins the procedure. Operation 900 may be followed by Operation 902. Operation 902 illustrates instantiating a storage stack that is operable to provide an active I/O path to a storage volume. Operation 902 may be followed by Operation 904. Operation 904 illustrates configuring a virtual disk as a representation of the storage volume. Operation 904 may be followed by Operation 906. Operation 906 illustrates exposing the virtual disk and the storage volume as dual paths to the same storage endpoint. Operation 906 may be followed by Operation 908. Operation 908 illustrates instantiating an alternative I/O path to the virtual disk. In an embodiment, the alternative I/O path includes a layout driver configured to manage a converted storage layout for the storage volume.

Operation 908 may be followed by operation 910. Operation 910 illustrates closing the active I/O path and activating the alternative I/O path. Operation 910 may be followed by operation 912. Operation 912 illustrates converting the storage layout of the storage volume from a first storage layout to a second storage layout without taking the storage volume offline and without requiring a reboot of the computing device.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the described methods are described herein as being implemented, at least in part, by system components, which can comprise an application, component and/or a circuit. In some configurations, the system components include a dynamically linked library (DLL), a statically linked library, functionality produced by an application programming interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of FIG. 1-9, it can be appreciated that the operations of the described methods may be also implemented in many other ways. For example, the methods may be implemented, at least in part, by a processor of another remote computer or a local circuit. In addition, one or more of the operations of the methods may alternatively or additionally be implemented, at least in part, by a chipset working alone or in conjunction with other software modules. Any service, circuit or application suitable for providing the techniques disclosed herein can be used in operations described herein.

Figure 10:
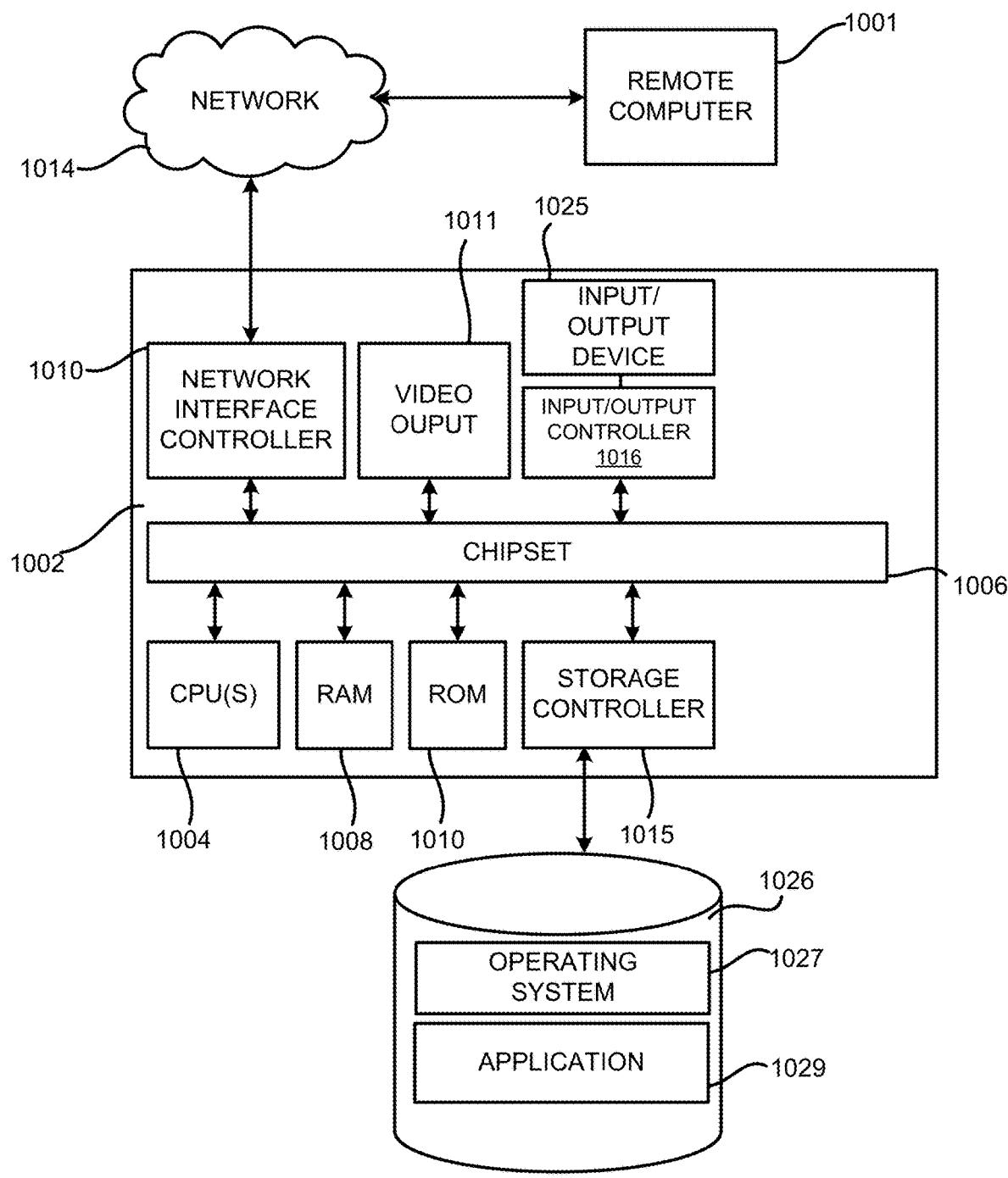
FIG. 10 is a computer architecture diagram illustrating a computing device architecture for a computing device capable of implementing aspects of the techniques and technologies presented herein.

FIG. 10 shows additional details of an example computer architecture capable of various aspects of the embodiments described above. The computer architecture shown in FIG. 10 illustrates aspects of a system, such as a conventional server computer, workstation, desktop computer, laptop, tablet, computing or processing systems embedded in devices (such as wearables, automobiles, home automation etc.), or other computing device, and may be utilized to execute any of the software components presented herein. For example, the computer architecture shown in FIG. 10 may be utilized to execute any of the software components described above.

The computer architecture includes a baseboard 1002, or "motherboard," which is a printed circuit board to which a multitude of components or devices may be connected by way of a system bus or other electrical communication paths. In one illustrative embodiment, one or more central processing units ("CPUs") 1004 operate in conjunction with a chipset 1006. The CPUs 1004 may be standard programmable processors that perform arithmetic and logical operations necessary for the operation of the computer architecture.

The CPUs 1004 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 may provide an interface to a RAM 1008, used as the main memory in the computer architecture. The chipset 1006 may further provide an interface to a computer-readable storage medium such as a read-only memory ("ROM") 1010 or non-volatile RAM ("NVRAM") for storing basic routines that help to startup the computing device and to transfer information between the various components and devices. The ROM 1010 or NVRAM may also store other software components necessary for the operation of the computer architecture in accordance with the embodiments described herein.

The computer architecture may operate in a networked environment using logical connections to remote computing devices and computer systems through a network 1014, such as the local area network. The chipset 1006 may include functionality for providing network connectivity through a network interface controller (NIC) 1010, such as a gigabit Ethernet adapter. The NIC 1010 is capable of connecting the computer architecture to other computing devices over the network 1014. It should be appreciated that multiple NICs 1010 may be present in the computer architecture, connecting the computer to other types of networks and remote computer systems. The network allows the computer architecture to communicate with remote services and servers, such as the remote computer 1001. As can be appreciated, the remote computer 1001 may host a number of services such as the XBOX LIVE gaming service provided by MICROSOFT CORPORATION of Redmond, Wash. In addition, as described above, the remote computer 1001 may mirror and reflect data stored on the computer architecture and host services that may provide data or processing for the techniques described herein.

The computer architecture may be connected to a mass storage device 1026 that provides non-volatile storage for the computing device. The mass storage device 1026 may store system programs, application programs, other program modules, and data, which have been described in greater detail herein. The mass storage device 1026 may be connected to the computer architecture through a storage controller 1015 connected to the chipset 1006. The mass storage device 1026 may consist of one or more physical storage units. The storage controller 1015 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 1026, other storage media and the storage controller 1015 may include MultiMediaCard (MMC) components, eMMC components, Secure Digital (SD) components, PCI Express components, or the like.

The computer architecture may store data on the mass storage device 1026 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1026 is characterized as primary or secondary storage, and the like.

For example, the computer architecture may store information to the mass storage device 1026 by issuing instructions through the storage controller 1015 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer architecture may further read information from the mass storage device 1026 by detecting the physical states or characteristics of one or more particular locations within the physical storage units.

In addition to the mass storage device 1026 described above, the computer architecture may have access to other computer-readable media to store and retrieve information, such as program modules, data structures, or other data. As the operating system 1027, the application 1029, other data and other modules are depicted as data and software stored in the mass storage device 1026, it should be appreciated that these components and/or other modules may be stored, at least in part, in other computer-readable storage media of the computer architecture. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer architecture. For purposes of the claims, the phrase "computer storage medium," "computer-readable storage medium," and variations thereof, does not include waves or signals per se and/or communication media.

The mass storage device 1026 may store an operating system 1027 utilized to control the operation of the computer architecture. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, WINDOWS PHONE or iOS operating systems, available from their respective manufacturers. It should be appreciated that other operating systems may also be utilized. The mass storage device 1026 may store other system or application programs and data utilized by the computer architecture, such as any of the other software components and data described above. The mass storage device 1026 might also store other programs and data not specifically identified herein.

In one embodiment, the mass storage device 1026 or other computer-readable storage media is encoded with computer-executable instructions which, when loaded into the computer architecture, transform the computer from a general-purpose computing system into a special-purpose computer capable of implementing the embodiments described herein. These computer-executable instructions transform the computer architecture by specifying how the CPUs 1004 transition between states, as described above. According to one embodiment, the computer architecture has access to computer-readable storage media storing computer-executable instructions which, when executed by the computer architecture, perform the various routines described above with regard to FIG. 10, and the other FIGURES. The computing device might also include computer-readable storage media for performing any of the other computer-implemented operations described herein.

The computer architecture may also include one or more input/output controllers 1016 for receiving and processing input from a number of input devices, such as a keyboard, a mouse, a microphone, a headset, a touchpad, a touch screen, an electronic stylus, image processing and gesture recognition devices, or any other type of input device. The input/output controller 1016 is in communication with an input/output device 1025. The input/output controller 1016 may provide output to a display, such as a computer monitor, a flat-panel display, a digital projector, a printer, a plotter, or other type of output device. The input/output controller 1016 may provide input communication with other devices such as a microphone, a speaker, game controllers and/or audio devices.

For example, the input/output controller 1016 can be an encoder and the input/output device 1025 can include a full speaker system having a plurality of speakers. The encoder can use a spatialization technology, and the encoder can process audio output audio or output signals received from the application 1010. The encoder can utilize a selected spatialization technology to generate a spatially encoded stream that appropriately renders to the input/output device 1025.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

EXAMPLE CLAUSES

The disclosure presented herein encompasses the subject matter set forth in the following example clauses.

Example Clause A, a computer-implemented method for online conversion of a storage layout for a storage volume of a storage device, the method comprising:

allocating a virtual disk as a representation of the storage volume, the storage volume having a first storage layout;

configuring the virtual disk with metadata associated with the storage volume;

instantiating a storage stack that is operable to provide an active I/O path to the storage volume;

modifying the storage stack by adding an alternative I/O path to the virtual disk, wherein the alternative I/O path includes a layout driver configured to manage a converted storage layout for the storage volume;

encapsulating the storage volume to the virtual disk;

closing the active I/O path and activating the alternative I/O path for I/O requests to the virtual disk; and converting the first storage layout of the storage device to a second storage layout while the alternative I/O path is being used to receive I/O requests.

Example Clause B, the computer-implemented method of Example Clause A, wherein the converting the first storage layout comprises adding a mirrored copy of the storage volume.

Example Clause C, the computer-implemented method of any one of Example Clauses A through B, wherein the converting the first storage layout comprises adding a parity scheme for the storage volume.

Example Clause D, the computer-implemented method of any one of Example Clauses A through C, further comprising updating a partition table of the virtual disk to indicate presence of the virtual disk.

Example Clause E, the computer-implemented method of any one of Example Clauses A through D, further comprising shrinking the storage volume to reserve space for associated metadata.

Example Clause F, the computer-implemented method of any one of Example Clauses A through E, further comprising creating a storage pool for the converted storage layout.

Example Clause G, the computer-implemented method of any one of Example Clauses A through F, wherein closing the active I/O path comprises:
  exposing the virtual disk and the storage volume as valid I/O paths; and
  removing the storage volume from a partition table of the storage volume.

Example Clause H, the computer-implemented method of any one of Example Clauses A through G, further comprising:
  creating a storage pool;
  adding one or more storage devices to the storage pool; and
  resilvering data from the storage volume to the added storage devices.

Example Clause I, the computer-implemented method of any one of Example Clauses A through H, wherein the layout driver is configured to support a plurality of storage layouts.

While Example Clauses A through I are described above with respect to a computer-implemented method, it is understood in the context of this disclosure that the subject matter of Example Clauses A through I can additionally or alternatively be implemented by a system or device or computer readable medium.

Example Clause J, a computing device comprising:
  one or more processors;
  a memory in communication with the one or more processors, the memory having computer-readable instructions stored thereupon which, when executed by the one or more processors, cause the computing device perform operations comprising:
    instantiating a storage stack that is operable to provide an active I/O path to a storage volume;
    configuring a virtual disk as a representation of the storage volume;
    exposing the virtual disk and the storage volume as dual paths to the same storage endpoint;
    instantiating an alternative I/O path to the virtual disk, wherein the alternative I/O path includes a layout driver configured to manage a converted storage layout for the storage volume;
    closing the active I/O path and activating the alternative I/O path; and
    converting the storage layout of the storage volume from a first storage layout to a second storage layout without taking the storage volume offline and without requiring a reboot of the computing device.

Example Clause K, the computing device of Example Clause J, wherein the storage layout is converted to implement one or more of mirroring, parity, or striping.

Example Clause L, the computing device of any one of Example Clauses I through K, wherein configuring the virtual disk comprises determining storage metadata for the storage volume and adding a copy of the storage metadata at the virtual disk.

Example Clause M, the computing device of any one of Example Clauses I through L, wherein allocated space for the storage volume is reduced to reserve space for the storage metadata.

Example Clause N, the computing device of any one of Example Clauses I through M, wherein closing the active I/O path comprises removing an indication of the storage volume at a partition manager for the storage volume.

Example Clause O, the computing device of any one of Example Clauses I through N, further comprising computer-readable instructions stored thereupon which, when executed by the one or more processors, cause the computing device perform operations comprising:
  exposing the virtual disk and the storage volume as dual paths to the same storage endpoint;
  adding an alternative I/O path to the virtual disk, wherein the alternative I/O path does not include the layout driver;
  closing a current I/O path and activating the alternative I/O path; and
  converting the storage layout of the storage volume from the second storage layout to the first storage layout.

Example Clause P, the computing device of any one of Example Clauses I through O, further comprising computer-readable instructions stored thereupon which, when executed by the one or more processors, cause the computing device perform operations comprising:
  creating a storage pool for the converted storage layout.

Example Clause Q, the computing device of any one of Example Clauses I through P, wherein the storage layout is converted to implement mirroring, further comprising computer-readable instructions stored thereupon which, when executed by the one or more processors, cause the computing device perform operations comprising:
  creating a storage pool;
  adding one or more storage devices to the storage pool; and
  resilvering data from the storage volume to the added storage devices.

While Example Clauses I through Q are described above with respect to a computing device, it is understood in the context of this disclosure that the subject matter of Example Clauses I through Q can additionally or alternatively be implemented by a system or method or computer readable medium.

Example Clause R, a computer-readable storage medium having computer-executable instructions stored thereupon which, when executed by one or more processors of a computing device, cause the computing device to perform operations comprising:
  allocating a virtual disk as a representation of a storage volume;
  configuring the virtual disk with metadata corresponding to the storage volume;
  instantiating a storage stack that is operable to provide an active I/O path to the storage volume;

adding an alternative I/O path to the virtual disk, wherein the alternative I/O path includes a layout driver configured to manage a converted storage layout for the storage volume;
encapsulating the storage volume to the virtual disk;
closing the active I/O path, thereby enabling the alternative I/O path for I/O requests to the virtual disk; and
converting a storage layout of the storage volume without taking the storage volume offline.

Example Clause S, the computer-readable medium of Example Clause R, wherein closing the active I/O path comprises:
exposing the virtual disk and the storage volume as valid I/O paths; and
removing references to the storage volume from a partition table of the storage volume.

Example Clause T, the computer-readable medium of any one of Example Clauses R through S, wherein the layout driver is configured to support a plurality of storage layouts.

While Example Clauses R through T are described above with respect to a computer-readable medium, it is understood in the context of this disclosure that the subject matter of Example Clauses R through T can additionally or alternatively be implemented by a method or via a computing device or via a system.

What is claimed is:

1. A computer-implemented method for online conversion of a storage layout for a storage volume of a storage device, the method comprising:
configuring a virtual disk with metadata associated with a storage volume having a first storage layout;
instantiating a storage stack that is operable to provide an active I/O path to the storage volume;
modifying the storage stack by adding an alternative I/O path to the virtual disk, wherein the alternative I/O path includes a layout driver configured to manage a converted storage layout for the storage volume;
encapsulating the storage volume to the virtual disk;
closing the active I/O path and activating the alternative I/O path for I/O requests to the virtual disk; and
converting the first storage layout of the storage device to a second storage layout while the alternative I/O path is being used to receive I/O requests.

2. The computer-implemented method of claim 1, wherein the converting the first storage layout comprises adding a mirrored copy of the storage volume.

3. The computer-implemented method of claim 2, further comprising:
creating a storage pool;
adding one or more storage devices to the storage pool; and
resilvering data from the storage volume to the added storage devices.

4. The computer-implemented method of claim 1, wherein the converting the first storage layout comprises adding a parity scheme for the storage volume.

5. The computer-implemented method of claim 1, further comprising updating a partition table of the virtual disk to indicate presence of the virtual disk.

6. The computer-implemented method of claim 1, further comprising shrinking the storage volume to reserve space for associated metadata.

7. The computer-implemented method of claim 1, further comprising creating a storage pool for the converted storage layout.

8. The computer-implemented method of claim 1, wherein closing the active I/O path comprises:
exposing the virtual disk and the storage volume as valid I/O paths; and
removing the storage volume from a partition table of the storage volume.

9. The computer-implemented method of claim 1, wherein the layout driver is configured to support a plurality of storage layouts.

10. A computing device comprising:
one or more processors;
a memory in communication with the one or more processors, the memory having computer-readable instructions stored thereupon which, when executed by the one or more processors, cause the computing device to perform operations comprising:
instantiating a storage stack that is operable to provide an active I/O path to a storage volume;
configuring a virtual disk as a representation of the storage volume;
exposing the virtual disk and the storage volume as dual paths to the same storage endpoint;
instantiating an alternative I/O path to the virtual disk, wherein the alternative I/O path includes a layout driver configured to manage a converted storage layout for the storage volume;
closing the active I/O path and activating the alternative I/O path; and
converting the storage layout of the storage volume from a first storage layout to a second storage layout without taking the storage volume offline and without requiring a reboot of the computing device.

11. The computing device of claim 10, wherein the storage layout is converted to implement one or more of mirroring, parity, or striping.

12. The computing device of claim 11, wherein the storage layout is converted to implement mirroring, further comprising computer-readable instructions stored thereupon which, when executed by the one or more processors, cause the computing device perform operations comprising:
creating a storage pool;
adding one or more storage devices to the storage pool; and
resilvering data from the storage volume to the added storage devices.

13. The computing device of claim 10, wherein configuring the virtual disk comprises determining storage metadata for the storage volume and adding a copy of the storage metadata at the virtual disk.

14. The computing device of claim 13, wherein allocated space for the storage volume is reduced to reserve space for the storage metadata.

15. The computing device of claim 10, wherein closing the active I/O path comprises removing an indication of the storage volume at a partition manager for the storage volume.

16. The computing device of claim 10, further comprising computer-readable instructions stored thereupon which, when executed by the one or more processors, cause the computing device to perform operations comprising:
exposing the virtual disk and the storage volume as dual paths to the same storage endpoint;
adding an alternative I/O path to the virtual disk, wherein the alternative I/O path does not include the layout driver;
closing a current I/O path and activating the alternative I/O path; and
converting the storage layout of the storage volume from the second storage layout to the first storage layout.

17. The computing device of claim 10, further comprising computer-readable instructions stored thereupon which, when executed by the one or more processors, cause the computing device perform operations comprising:
creating a storage pool for the converted storage layout.

18. A computer-readable storage medium having computer-executable instructions stored thereupon which, when executed by one or more processors of a computing device, cause the computing device to perform operations comprising:
configuring a virtual disk with metadata corresponding to a storage volume;
instantiating a storage stack that is operable to provide an active I/O path to the storage volume;
adding an alternative I/O path to the virtual disk, wherein the alternative I/O path includes a layout driver configured to manage a converted storage layout for the storage volume;
encapsulating the storage volume to the virtual disk;
closing the active I/O path, thereby enabling the alternative I/O path for I/O requests to the virtual disk; and
converting a storage layout of the storage volume without taking the storage volume offline.

19. The computer-readable storage medium of claim 18, wherein closing the active I/O path comprises:
exposing the virtual disk and the storage volume as valid I/O paths; and
removing references to the storage volume from a partition table of the storage volume.

20. The computer-readable storage medium of claim 18, wherein the layout driver is configured to support a plurality of storage layouts.

* * * * *